(12) United States Patent
Dunko (10) Patent No.: US 8,989,720 B2
(45) Date of Patent: Mar. 24, 2015

(54) PORTABLE COMMUNICATION DEVICE

(75) Inventor: Gregory A. Dunko, Cary, NC (US)

(73) Assignee: HTC Corporation, Taoyuan, Taoyuan County (TW)

( * ) Notice: Subject to any disclaimer, the term of this patent is extended or adjusted under 35 U.S.C. 154(b) by 368 days.

(21) Appl. No.: 13/302,089

(22) Filed: Nov. 22, 2011

(65) Prior Publication Data

US 2013/0130666 A1 May 23, 2013

(51) Int. Cl.
| H04M 3/42 | (2006.01) |
| H04W 4/06 | (2009.01) |
| H04M 3/56 | (2006.01) |
| H04W 4/02 | (2009.01) |
| H04W 76/00 | (2009.01) |
| H04W 64/00 | (2009.01) |

(52) U.S. Cl.
CPC ............ *H04W 4/06* (2013.01); *H04M 3/42068* (2013.01); *H04M 3/563* (2013.01); *H04M 3/565* (2013.01); *H04W 4/02* (2013.01); *H04M 2207/18* (2013.01); *H04M 2242/14* (2013.01); *H04M 2242/30* (2013.01); *H04W 76/002* (2013.01); *H04W 64/00* (2013.01)
USPC ..................... 455/416; 455/456.3; 455/414.1; 379/158; 379/202.01

(58) Field of Classification Search
USPC ........ 455/456.1–457, 416, 414.1, 556.1, 557, 455/569.1, 417, 445; 379/158, 202.01, 379/204.01
See application file for complete search history.

(56) References Cited

U.S. PATENT DOCUMENTS

| 8,515,040 B2* | 8/2013 | Wengrovitz ............. 379/202.01 |
| 2004/0198330 A1* | 10/2004 | Graf et al. .................. 455/414.1 |
| 2005/0031110 A1* | 2/2005 | Haimovich et al. ...... 379/202.01 |
| 2005/0227680 A1* | 10/2005 | Snowden ...................... 455/416 |
| 2006/0072728 A1* | 4/2006 | Cope et al. ............... 379/202.01 |
| 2011/0007887 A1* | 1/2011 | Green et al. ............. 379/203.01 |
| 2013/0066545 A1* | 3/2013 | Meisels et al. ................ 701/400 |

* cited by examiner

*Primary Examiner* — Marcos Torres
(74) *Attorney, Agent, or Firm* — McClure, Qualey & Rodack, LLP (57) ABSTRACT

Various embodiments for conducting a phone conferencing session are disclosed. One embodiment is a method implemented in a communication device for conducting a phone conferencing session. The method comprises determining that a user of the communication device wishes to initiate the phone conferencing session, determining a current location of the communication device, retrieving information relating to the user for initiating the phone conferencing session, and initiating the phone conferencing session associated according to the information relating to the user.

24 Claims, 8 Drawing Sheets

PORTABLE COMMUNICATION DEVICE

BACKGROUND

Teleconferencing is a commonly-used alternative to face-to-face meetings, particularly for participants who are geographically dispersed. Generally, individuals participate in a conference call by dialing into a pre-established conference call bridge at a designated time and then entering a passcode to join the call. One perceived shortcoming with this approach, however, is that individuals who are invited to participate in a conference call must remember or retrieve the phone number associated with the conference call. An individual must also remember or retrieve the passcode assigned to that individual in order to join in the conference call. Another challenge for users that travel frequently is the need to use different "toll free" numbers for a given present location.

SUMMARY

Briefly described, one embodiment, among others, is a method implemented in a communication device for conducting a phone conferencing session. The method comprises determining that a user of the communication device wishes to initiate the phone conferencing session, determining a current location of the communication device, retrieving information relating to the user for initiating the phone conferencing session, and initiating the phone conferencing session associated according to the information relating to the user.

Another embodiment is a method that comprises retrieving an input from a user of the communication device to initiate the phone conferencing session, determining a current location of the communication device, retrieving information relating to the user, where the information includes a phone conferencing session status of the user. The method further comprises initiating the phone conferencing session according to the retrieved information.

Another embodiment is a non-transitory computer-readable medium embodying a program executable in a communication device. The program comprises code that retrieves an input from a user of the communication device to initiate the phone conferencing session, wherein the input from the user specifies a phone conferencing session status of the user, code that determines a current location of the communication device, code that retrieves information for initiating the phone conferencing session according to both the current location and the user, and code that initiates the phone conferencing session according to the retrieved information.

Another embodiment is a mobile communication device that comprises a user interface module configured to retrieve an input from a user of the mobile communication device to initiate a phone conferencing session, wherein the input from the user specifies a phone conferencing session status of the user. The mobile communication device further comprises location logic configured to determine a current location of the communication device, a memory interface configured to retrieve information for initiating the phone conferencing session according to both the current location and the user, and a network interface configured to initiate the phone conferencing session according to the retrieved information.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 5 is a flowchart illustrating the functionality of the location logic in

FIG. 1.

DETAILED DESCRIPTION

Having summarized various aspects of the present disclosure, reference will now be made in detail to the description of the disclosure as illustrated in the drawings. While the disclosure will be described in connection with these drawings, there is no intent to limit it to the embodiment or embodiments disclosed herein. On the contrary, the intent is to cover all alternatives, modifications and equivalents included within the spirit and scope of the disclosure as defined by the appended claims.

Many enterprise users conduct global phone conferencing sessions through use of global teleconference dial-in services provided by audio/video conferencing service providers. Such service providers typically provide users with a host of local toll-free or low cost dial-in numbers that are country-specific. Users are also typically provided with unique personal identification numbers (PINs) that allow users to conduct a phone conferencing session either as a host or as a participant. One perceived shortcoming with this approach, however, is that individuals who are invited to participate on a conference call must remember or retrieve the dial-in phone number associated with the conference call. An individual must also remember or retrieve the passcode assigned to that individual in order to join in the conference call.

Embodiments of a portable communication device that function as a conference speakerphone accessory are described with the ability to store and dial "enterprise" connection numbers in addition to store and autodial user moderator\participant personal identification number (PIN) codes. The various embodiments of a communication device disclosed herein determine a current location either via an internal global positioning satellite (GPS) module or a network based location determination system, or via a connection to another device such as a mobile phone with location determination capability.

Users are thus able to carry the portable communication device on a business trip, for example, and efficiently participate in phone conferencing sessions. For some embodiments, the communication device determines its current location and looks up an enterprise country number (e.g., a toll free number for Taiwan). If prompted, the communication device submits the user's PIN. For some embodiments, the portable communication device includes an internal PIN look-up system or retrieves PIN information from another device such as a mobile phone or remote server. In this regard, the embodiments disclosed allow users to simply initiate a phone conferencing session without the need to retrieve a phone number and PIN number/access code. Various embodiments incorporate a location determination feature that enables the communication device to automatically dial in a country-specific number for an enterprise application.

Figure 1:
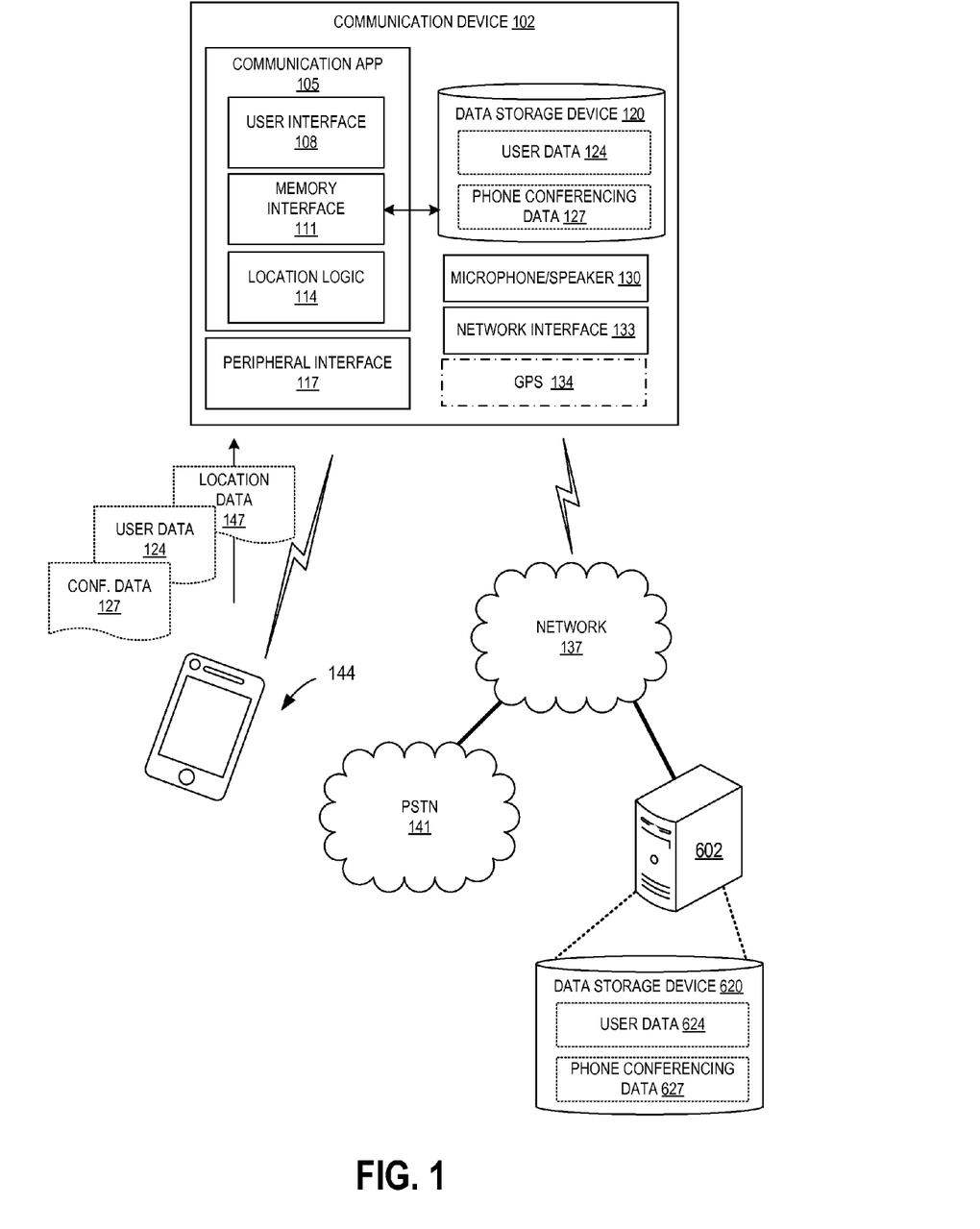
FIG. 1 is a block diagram of a communication device in which embodiments of conducting phone conferencing sessions may be implemented.

A description of a system for conducting a phone conferencing session is now described followed by a discussion of the operation of the components within the system. FIG. 1 is a block diagram of a communication device 102 in which embodiments of conducting phone conferencing sessions may be implemented. The communication device 102 may be embodied, for example, as a portable conference phone or a computing device with audio capabilities. For some implementations, the communication device 102 may include a display (not shown) and an input device such as a keyboard or keypad (not shown).

The communication device 102 includes a communication application 105 executed on a processing device on the communication device 102. The communication application 105 includes a user interface 108, a memory interface 111, and location logic 114. The user interface 108 allows a user to interact with the communication device 102 and initiate phone conferencing sessions.

The memory interface 111 is coupled to a data storage device 120 that stores such data as user data 124 that includes, by way of example and without limitation, one or more personal identification numbers (PINs), calendar data specifying scheduled phone conferencing sessions, and user status associated with each phone conferencing sessions. The user status may indicate, for example, whether the user is joining in a given phone conferencing session as the host of the phone conferencing session or simply as a participant.

The data stored in data storage 120 may further comprise phone conferencing data 127 such as, by way of example and without limitation, one or more dial-in numbers. For some embodiments, the dial-in numbers are country-specific toll free numbers, which allow users to participate in phone conferencing sessions without incurring the cost of an international call. Note that while FIG. 1 illustrates that user data 124 and phone conferencing data 127 is stored locally in the communication device 102, the user data 124 and phone conferencing data 127 may also be stored on a different device or remote entity and retrieved through a wired or wireless link.

For some embodiments, the user data 124 and phone conferencing data 127 may also be stored in a remote entity such as a remote computing device 602 equipped with a data storage device 620 for storing user data 624 and phone conferencing data 627. In this regard, data used for conducting a phone conferencing session may be stored locally on the communication device 102, stored remotely on a remote computing device 602, or a combination of both. For other embodiments, data used for conducting a phone conferencing session may be stored on the mobile phone 144 and retrieved via a link established with the communication device 102.

The communication application 105 further comprises location logic 114 configured to determine a current location of the communication device 102. For some embodiments, the location logic 114 interfaces with a GPS module 134 integrated into the communication device 102. For other embodiments, the location logic 114 may be configured to retrieve location 147 from a secondary device such as a mobile phone 144 equipped with a GPS receiver 134. Note that other network based or device based location determination systems may be used.

The communication device 102 also includes a peripheral interface 117 for interfacing with other devices such as the mobile phone 144 shown in FIG. 1. The peripheral interface 117 enables the communication device 102 to communicate with other devices via a wired or wireless link such as a Bluetooth® connection, a wireless local area network (WLAN) connection, a near field communication (NFC) link, and so on.

For some implementations, the user data 124 and phone conferencing data 127 are not stored locally in the communication device 102. For such implementations, the communication device 102 retrieves this data 124 and/or 127 from a secondary device such as the mobile device 144 shown. Where the communication device 102 does not include an integrated GPS module 134, the peripheral interface 117 may be further configured to retrieve location data 147 from a mobile device 144 equipped with GPS capabilities.

The communication device 102 also includes a microphone/speaker 130 for allowing a user to conduct conference calls via the communication device 102. The communication device 102 may also comprise a network interface 133 for communicating via a network 137. The communication device 102 may include one or modular ports for receiving modular connectors (e.g., a RJ-45 or RJ-11 cable) for connecting the communication device 102 directly to the Internet or to the public switched telephone network (PSTN) 141 for purposes of conducting a phone conferencing session.

Figure 2:
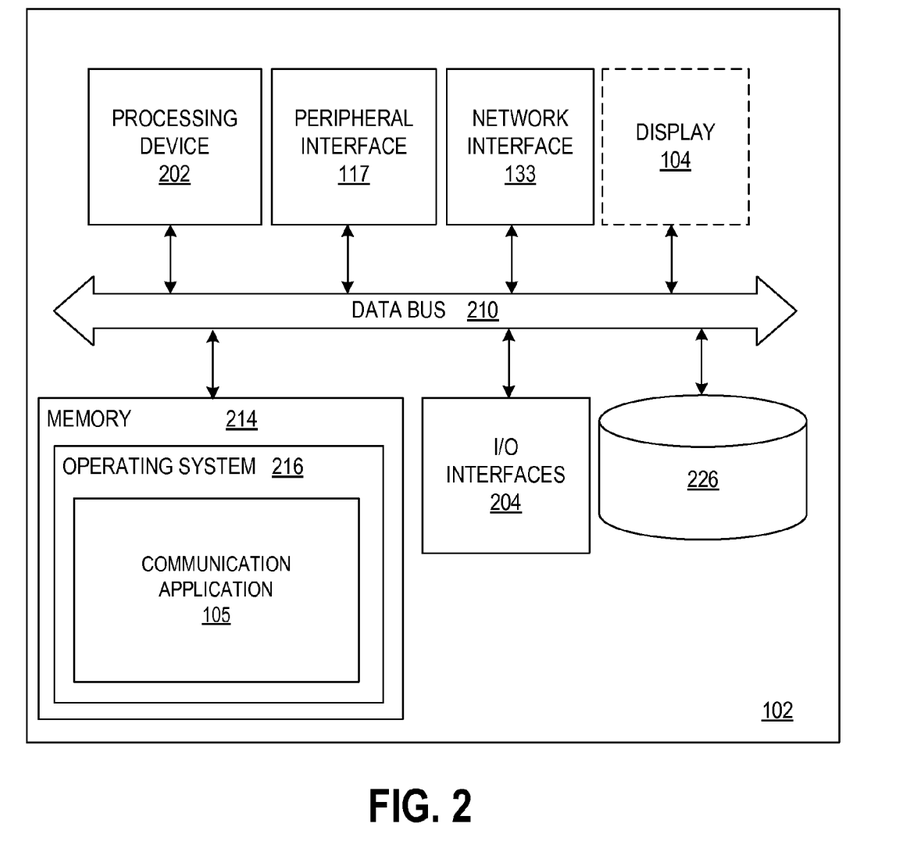
FIG. 2 is a schematic of the communication device shown in FIG. 1.

FIG. 2 is a schematic of the communication device 102 shown in FIG. 1. The communication device 102 may be embodied in any one of a wide variety of wired and/or wireless computing devices and so forth with audio capabilities to allow users to conduct phone conferencing sessions. As shown in FIG. 2, the communication device 102 comprises memory 214, a processing device 202, a number of input/output interfaces 204, a network interface 133, a display 104, a peripheral interface 117, and mass storage 226, wherein each of these devices are connected across a local data bus 210.

The processing device 202 may include any custom made or commercially available processor, a central processing unit (CPU) or an auxiliary processor among several processors associated with the communication device 102, a semiconductor based microprocessor (in the form of a microchip), a macro processor, one or more application specific integrated circuits (ASICs), a plurality of suitably configured digital logic gates, and other well known electrical configurations comprising discrete elements both individually and in various combinations to coordinate the overall operation of the computing system.

The memory 214 can include any one of a combination of volatile memory elements (e.g., random-access memory (RAM, such as DRAM, and SRAM, etc.)) and nonvolatile memory elements (e.g., ROM, hard drive, tape, CDROM, etc.). The memory 214 typically comprises a native operating system 216, one or more native applications, emulation systems, or emulated applications for any of a variety of operating systems and/or emulated hardware platforms, emulated operating systems, etc. For example, the applications may include application specific software which may comprise the communication application 105 described above in connection with FIG. 1. In accordance with such embodiments, the one or more components are stored in memory 214 and executed by the processing device 202. One of ordinary skill in the art will appreciate that the memory 214 can, and typically will, comprise other components which have been omitted for purposes of brevity.

Input/output interfaces 204 provide any number of interfaces for the input and output of data. For example, where the communication device 102 comprises a personal computer, these components may interface with one or more user interface devices, which may comprise, for example, a keyboard or a mouse. The display (not shown) may comprise a computer monitor, a plasma screen or other types of screens for a PC, a liquid crystal display (LCD) or other types of displays on a hand held device, or other display device.

In the context of this disclosure, a computer-readable medium stores programs for use by or in connection with an instruction execution system, apparatus, or device. More specific examples of a computer-readable medium may include by way of example and without limitation: a portable computer diskette, a random access memory (RAM), a read-only memory (ROM), an erasable programmable read-only memory (EPROM, EEPROM, or Flash memory), and a portable compact disc read-only memory (CDROM) (optical).

With further reference to FIG. 2, network interface device 133 comprises various components used to transmit and/or receive data over a network environment. For example, the network interface 133 may include a device that can communicate with both inputs and outputs, for instance, a modulator/demodulator (e.g., a modem), wireless (e.g., radio frequency (RF)) transceiver, a telephonic interface, a bridge, a router, network card, etc. The communication device 102 may communicate with one or more remote computing devices via the network interface 133 over the network 137 (FIG. 1). The data storage device 120 (FIG. 1) may be implemented in mass storage 226. The peripheral interface 117 supports various interfaces including, but not limited to IEEE-1394 High Performance Serial Bus (Firewire), USB, a serial connection, and a parallel connection.

Figure 3:
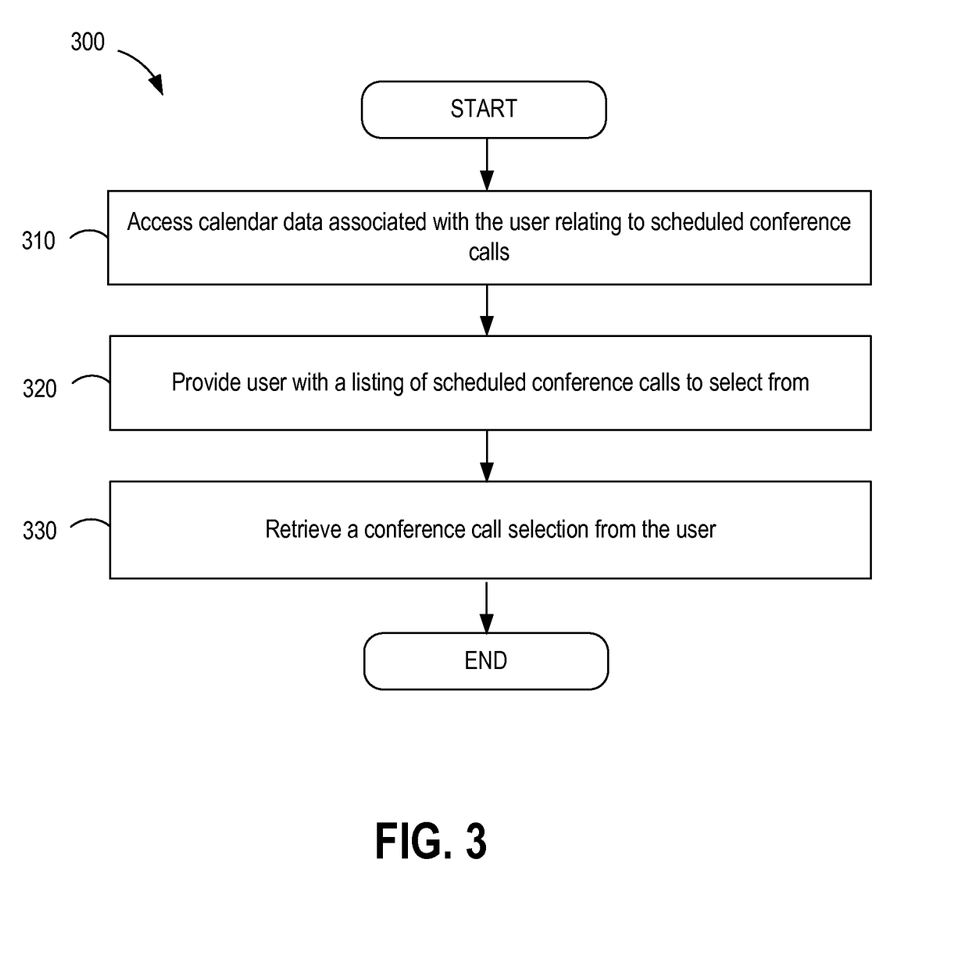
FIG. 3 is a flowchart illustrating the functionality of the user interface in FIG. 1.

Reference is made to FIG. 3, which is a flowchart 300 in accordance with one embodiment for conducting a phone conferencing session. It is understood that the flowchart of FIG. 3 provides merely an example of the many different types of functional arrangements that may be employed to implement the operation of the user interface 108 (FIG. 1) in the communication device 102 (FIG. 1) as described herein. As an alternative, the flowchart of FIG. 3 may be viewed as depicting an example of steps of a method implemented in the communication device 102 according to one or more embodiments.

In block 310, the user interface 108 may be configured to access calendar data embedded in the user data 124 (FIG. 1) stored in the data storage 120 to retrieve a listing of scheduled of conference calls for the user of the communication device 102. For some implementations, the communication device 102 includes an integrated display, which may comprise, for example, a liquid crystal display (LCD), used for facilitating the selection of a phone conferencing session. For such embodiments, the user interface 108 provides the user with a listing of scheduled conference calls to select from (block 320). In block 330 the user interface 108 retrieves a selection from the user relating to a phone conferencing session. The user may submit a selection via a touch-screen interface on the communication device 102 or via a keypad integrated into the communication device 102.

For alternative embodiments, the user interface 108 in the communication device 102 may be configured to simply alert the user when a previously-scheduled conference call is about to take place. For such embodiments, the user may simply press a button on a keypad on the communication device 102 to initiate the conference call. For example, the user interface 108 may be configured to alert the user one hour prior to the start of a previously-scheduled phone conferencing session. Once the time is reached for the phone conferencing session to begin, the user interface 108 may be further configured to provide the user with a simple prompt via the display to initiate the call without the need to enter the phone number or PIN code. The user may, for example, dial into the scheduled phone conferencing session by simply pressing a button on a keypad (e.g., the "ENTER" key).

As disclosed above, the communication device 102 may be coupled to a secondary device equipped with a display such as the mobile phone 144 (FIG. 1). For some embodiments, the communication device 102 may utilize the display on the secondary device to convey information to the user. Similarly, the communication device 102 may be configured to retrieve input from the user via a keyboard/keypad on the secondary device. As such, the communication device 102 may be embodied in a smaller form factor with audio capabilities such as, for example, a headset.

Figure 4:
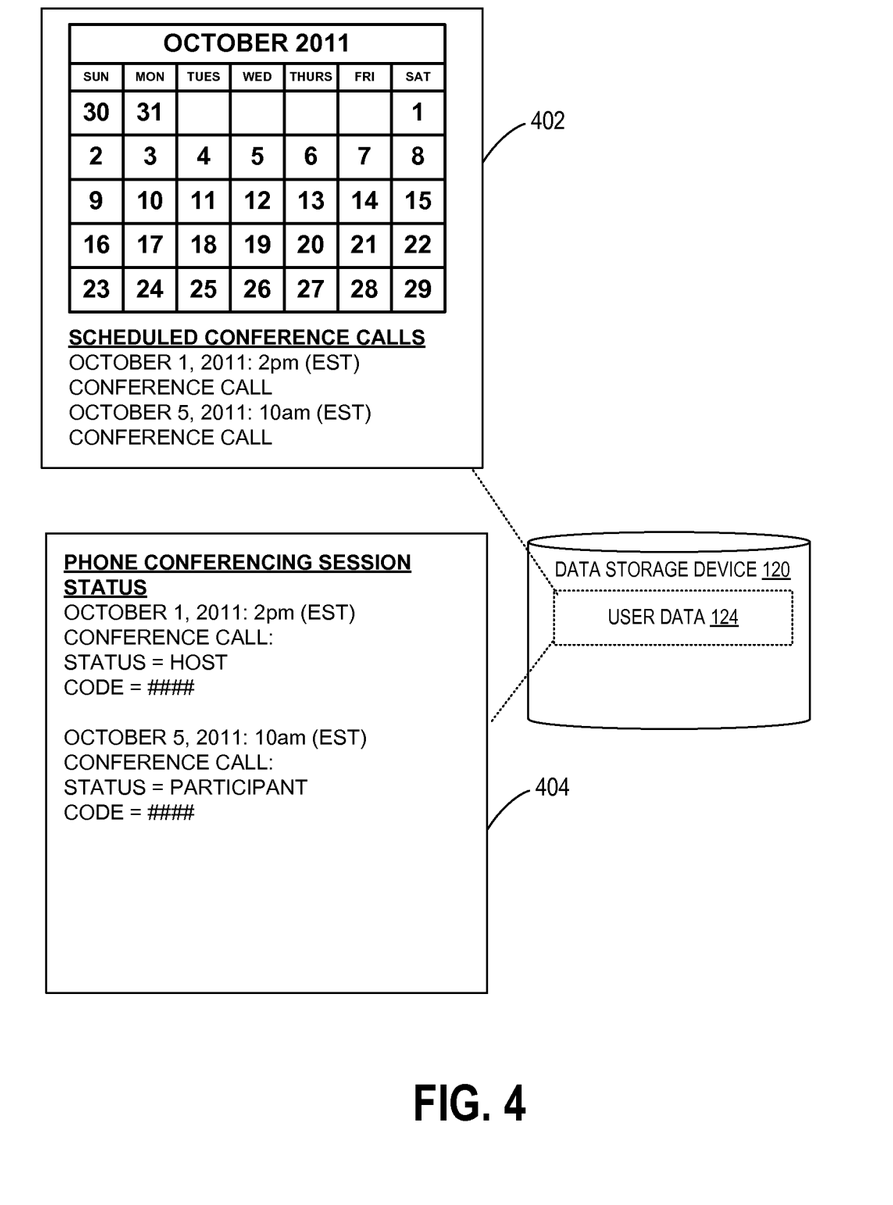
FIG. 4 illustrates the type of information that may be stored as part of the user data in memory of the communication device of FIG. 1.

Reference is made to FIG. 4, which illustrates the type of information that may be stored as part of the user data 124 in the data storage device 120 of the communication device 102. As shown, the user data 124 may comprise calendar data 402 that specifies a listing of previously-scheduled conference calls. In the example shown, two phone conferencing sessions have been scheduled—one on Oct. 1, 2011 at 2 pm (ET) and one on Oct. 5, 2011 at 10 am (ET).

As shown, the user data 124 may also include data 404 reflecting the status of the user for each of the two previously-scheduled phone conferencing sessions. For the phone conferencing session scheduled for October $1^{st}$, the user is hosting the call, whereas for the phone conferencing session scheduled for October $5^{th}$, the user is simply a participant. The code (e.g., PIN or passcode) for each phone conferencing session may also be included as part of the user data 124.

Figure 5:
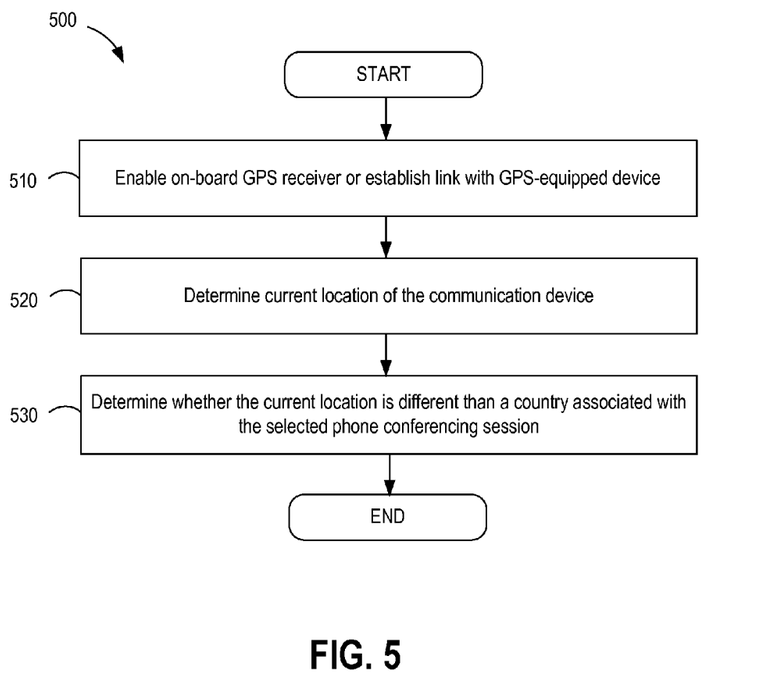

Reference is made to FIG. 5, which is a flowchart 500 in accordance with one embodiment for conducting a phone conferencing session. It is understood that the flowchart of FIG. 5 provides merely an example of the many different types of functional arrangements that may be employed to implement the operation of the location logic 114 (FIG. 1) in the communication device 102 (FIG. 1) as described herein. As an alternative, the flowchart of FIG. 5 may be viewed as depicting an example of steps of a method implemented in the communication device 102 according to one or more embodiments.

In block 510, the location logic 114 may be configured to enable a GPS receiver 134 (FIG. 1) if the communication device 102 includes an integrated GPS receiver 134. In block 520, the location logic 114 determines the current location of the communication device 102 using the GPS receiver 134. For alternative embodiments, the location logic 114 may be configured to enable a network based location determination system and determine the current location of the communication device 102 using the network based location determination system. For alternative embodiments, the location logic 114 may be configured to establish a link with a secondary device equipped with a GPS receiver and/or a network based location determination system, where the secondary device may comprise, for example, the mobile phone 144 (FIG. 1).

In block 530, the location logic 114 is configured to determine whether the current location is different than the country associated with the selected phone conferencing session. To illustrate, consider a scenario in which a phone conferencing session was initially scheduled for participants all currently located in the United States. Suppose that one of the participants travels overseas to Taiwan and wishes to participate in the previously scheduled conference call. In this example, the location logic 114 determines that the current location is Taiwan and upon determining that the current location differs from the original location, the current location is used to automatically retrieve an alternative dial-in number to avoid incurring the cost of an international call. Note that the location logic 114 may also be configured to determine whether a current location is different than a first location associated with the selected phone conferencing session, where the first location is not necessarily in a different country than that of the current location.

Figure 6A:
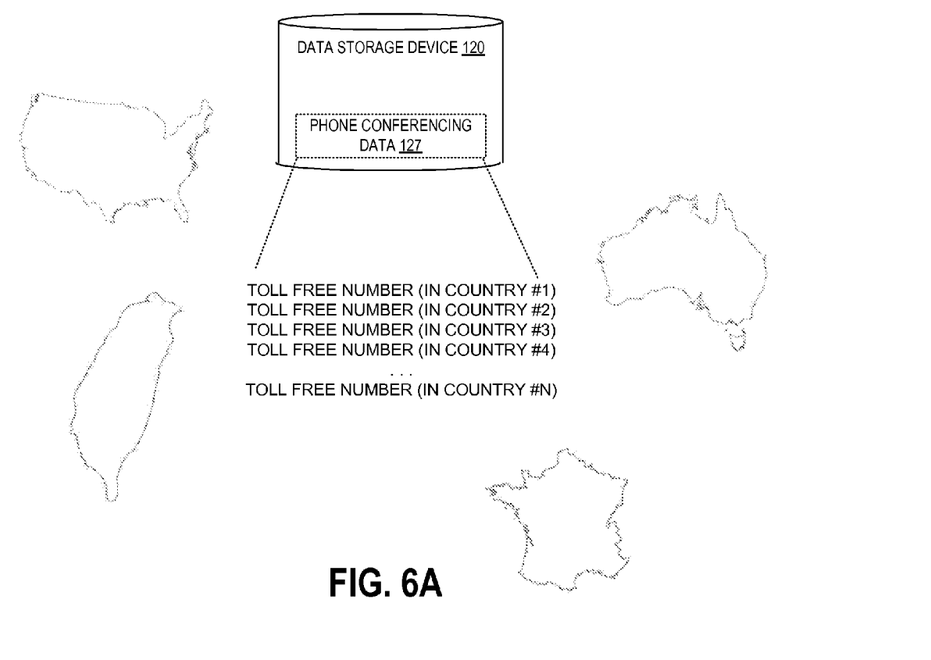
FIG. 6A provides an example of phone conferencing data stored in the memory of the communication device of FIG. 1.

As shown in FIG. 6A, the phone conferencing data 127 may comprise, among other data, a listing of international toll free numbers in which a participant of a phone conferencing session may dial into without incurring the cost of placing an international call. For some embodiments, the data storage device 120 in the communication device 102 stores an up-to-date list of available toll free numbers that the user of the communication device 102 may utilize.

Figure 6B:
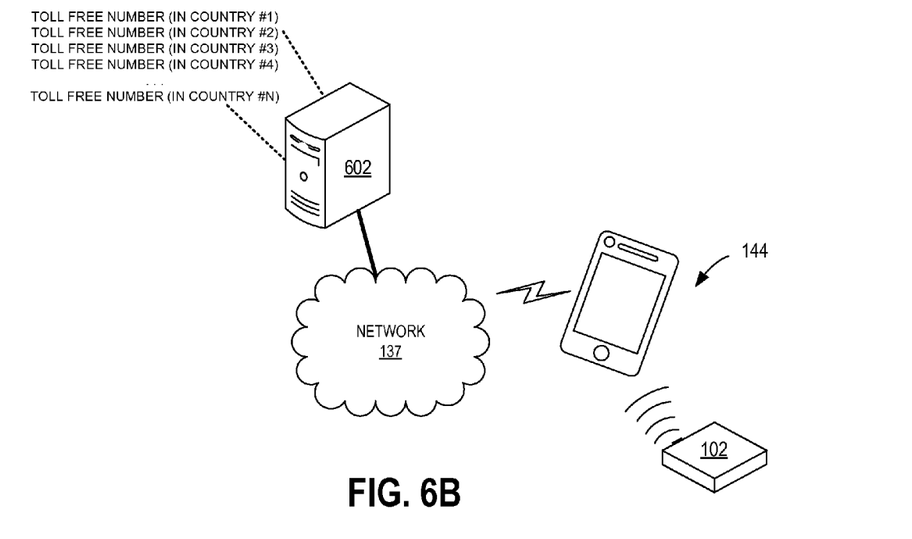
FIG. 6B illustrates the communication device of FIG. 1 updating the phone conferencing data stored in memory.

Reference is made to FIG. 6B, which illustrates the communication device 102 updating the phone conferencing data stored in the data storage device 120 (FIG. 6A). For some embodiments, the communication device 102 may be configured to periodically retrieve phone conferencing data from a remote entity to ensure that the phone conferencing data 127 (FIG. 6A) stored locally in the data storage device 120 is up to date. As described earlier, the communication device 102 may be coupled (e.g., via a Bluetooth connection) to a secondary device such as a mobile phone 144, which is connected to a network 137 such as the Internet. Through the mobile device 144 connected to the network 137, the communication device 102 retrieves phone conferencing data (e.g., a list of country-specific toll free numbers) from a remote computing device 602. The remote computing device 602 may be maintained, for example, by a service provider that provides phone conferencing services.

For some embodiments, the communication device 102 periodically polls the remote computing device 602 to determine whether any updates are available. The communication device 102 may also be configured to receive notifications from the remote computing device 602 indicating that updated phone conferencing data is available. Upon receiving the updated phone conferencing data, the communication device 102 stores the phone conferencing data 127 in the data storage device 120. Note that while the examples in FIGS. 6A and 6B are described in connection with country-specific toll free numbers, the embodiments described are not limited to country-specific toll free numbers.

Figure 7:
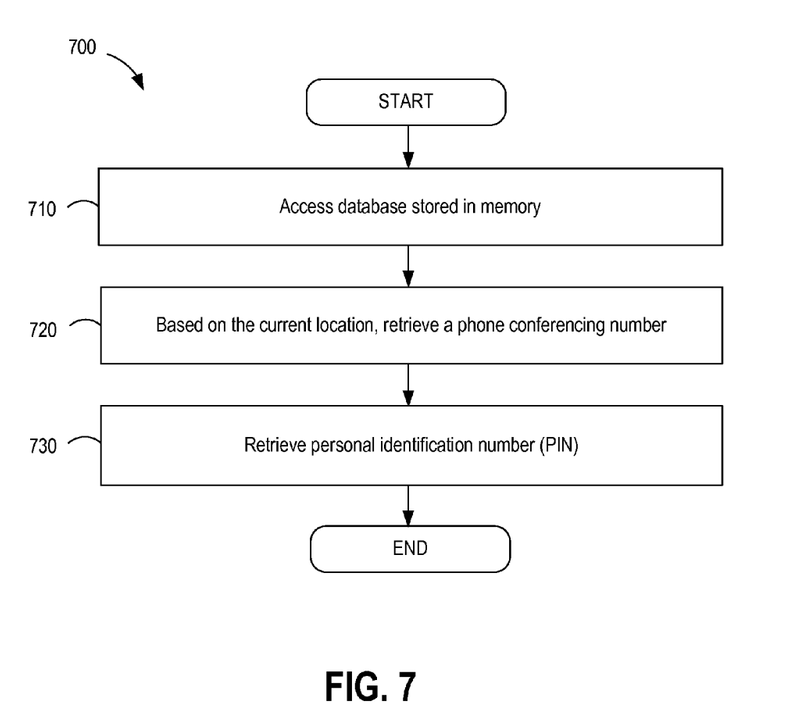
FIG. 7 is a flowchart illustrating the functionality of the memory interface in FIG. 1.

Reference is made to FIG. 7, which is a flowchart 700 in accordance with one embodiment for conducting a phone conferencing session. It is understood that the flowchart of FIG. 7 provides merely an example of the many different types of functional arrangements that may be employed to implement the operation of the memory interface 111 (FIG. 1) in the communication device 102 (FIG. 1) as described herein. As an alternative, the flowchart of FIG. 7 may be viewed as depicting an example of steps of a method implemented in the communication device 102 according to one or more embodiments.

In block 710, the memory interface 111 accesses the database stored in memory, which the memory may be implemented in an on-board memory on the communication device 102 or implemented in a secondary device. Note also that data may be stored in multiple memory devices. Based on the current location determined by the location logic 114 (FIG. 1), the memory interface 111 retrieves a phone number (block 720). In block 730, the memory interface 111 is further configured to retrieve a personal identification number (PIN) and/or passcode associated with the user of the communication device 102. For some embodiments, the communication device 102 initiates a phone conferencing session and automatically enters the PIN and/or passcode upon receiving a prompt.

Figure 8:
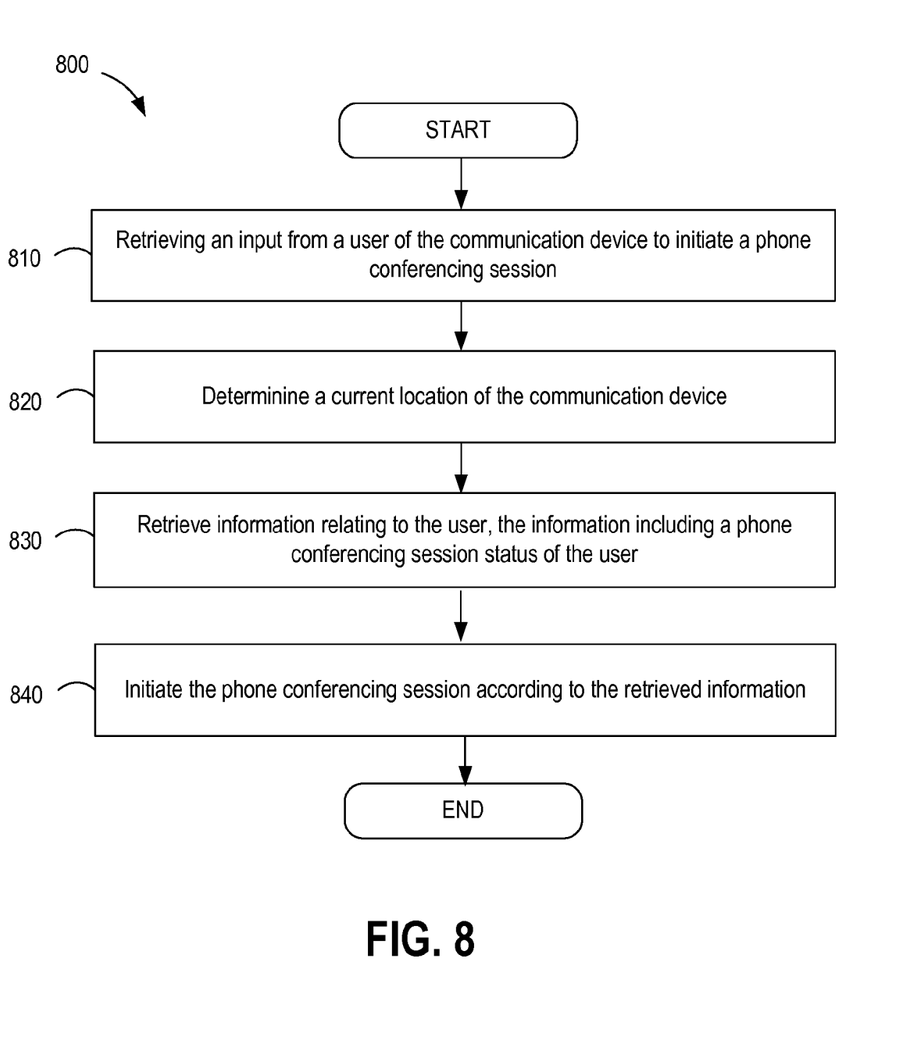
FIG. 8 is a flowchart in accordance with one embodiment for conducting a phone conferencing session implemented in the communication device of FIG. 1.

Having described the various components in the communication application 105 (FIG. 1) in the communication device 102 (FIG. 1), reference is made to FIG. 8, which is a flowchart 800 in accordance with one embodiment for conducting a phone conferencing session utilizing the various components. It is understood that the flowchart of FIG. 8 provides merely an example of the many different types of functional arrangements that may be employed to implement the operation of these components as described herein. As an alternative, the flowchart of FIG. 8 may be viewed as depicting an example of steps of a method implemented in the communication device 102 according to one or more embodiments.

In block 810, the communication device 102 retrieves an input from a user of the communication device to initiate a phone conferencing session. In block 820, a current location of the communication device is determined, and in block 830, the communication device retrieves information relating to the user, the information including a phone conferencing session status of the user. The status of the user may comprise, for example, a host status or a participant status. In block 840, the phone conferencing session is initiated by the communication device 102 according to the retrieved information.

It should be emphasized that the flowcharts of FIGS. 3, 5, 7, and 8 show examples of functionality of an implementation of portions of the user interface 108 (FIG. 1), memory interface 111 (FIG. 1), and the location logic 114 (FIG. 1). If embodied in software, each block may represent a module, segment, or portion of code that comprises program instructions to implement the specified logical function(s).

The program instructions may be embodied in the form of source code that comprises human-readable statements written in a programming language or machine code that comprises numerical instructions recognizable by a suitable execution system such as the processing device 202 (FIG. 2). The machine code may be converted from the source code, etc. If embodied in hardware, each block may represent a circuit or a number of interconnected circuits to implement the specified logical function(s).

Although the flowcharts of FIGS. 3, 5, 7, and 8 show a specific order of execution, it is understood that the order of execution may differ from that which is depicted. For example, the order of execution of two or more blocks may be scrambled relative to the order shown. Also, two or more blocks shown in succession in FIGS. 3, 5, 7, and 8 may be executed concurrently or with partial concurrence. Further, in some embodiments, one or more of the blocks shown in FIGS. 3, 5, 7, and 8 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that comprises software or code can be embodied in any non-transitory computer-readable medium for use by or in connection with an instruction execution system such as, for example, a processor in a computer system or other system. In this sense, each may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

At least the following is claimed:

1. A method implemented in a communication device comprising a headset for participating in a phone conferencing session, comprising:
   retrieving, by the headset, calendar data from a second communication device, wherein the calendar data comprises schedule information for a conference call;
   retrieving, by the headset, location data determined by the second communication device;
   retrieving, by the headset, a conference call number assigned to a geographical area corresponding to the location data, wherein the conference call number is stored in the second communication device;
   receiving a command from a user via manipulation of a button on the headset for initiating the conference call; and
   dialing, by the headset, the retrieved conference call number to participate in the phone conferencing session.

2. The method of claim 1, wherein initiating the phone conferencing session is triggered by an alert associated with a scheduled meeting.

3. The method of claim 1, wherein initiating the phone conferencing session according to the information comprises dialing a phone conferencing number according to the current location of the mobile device.

4. The method of claim 1, wherein initiating the phone conferencing session according to the information comprises dialing a phone conferencing number contained in the retrieved information.

5. The method of claim 4, wherein initiating the phone conferencing session according to the information further comprises transmitting a user personal identification number (PIN) contained in the retrieved information.

6. The method of claim 5, wherein transmitting the user PIN is performed responsive to the communication device receiving a prompt to enter the user PIN.

7. The method of claim 5, wherein transmitting the user PIN is performed according to the user having one of a moderator status and a participant status for the phone conferencing session.

8. The method of claim 5, wherein retrieving information relating to the user for initiating the phone conferencing session comprises:
   determining whether a current location of the communication device is different than a first location associated with a first phone conferencing number; and
   retrieving at least one alternative phone conferencing number for initiating the phone conferencing session according to the current location.

9. The method of claim 1, further comprising establishing a link with a second communication device comprising a mobile phone, wherein the step of initiating the phone conferencing session is performed by the communication device via the link established with the mobile phone.

10. A method implemented in a communication device comprising a headset for participating in a phone conferencing session, comprising:
    retrieving, by the headset, location data determined by the second communication device;
    retrieving, by the headset, information stored in the second communication device relating to the user, the information including a phone conferencing session status of the user and a conference call number assigned to a geographical area corresponding to the current location of the communication device; and
    dialing, by the headset, the retrieved conference call number to participate in the phone conferencing session.

11. The method of claim 10, wherein the information further comprises:
    a phone number associated with the phone conferencing session.

12. The method of claim 10, wherein the information further comprises a personal identification number (PIN) associated with the user, wherein the PIN corresponds to the phone conferencing session status of the user.

13. The method of claim 10, wherein retrieving information relating to the user comprises retrieving a phone conferencing number from among a plurality of phone conferencing numbers according to the determined current location of the communication device.

14. The method of claim 10, further comprising prior to initiating the phone conferencing session, establishing a connection to the Internet.

15. The method of claim 10, further comprising prior to initiating the phone conferencing session, establishing a connection to a second communication device, the second communication device comprising a mobile phone.

16. The method of claim 10, wherein retrieving information relating to the user comprises retrieving the information from a database stored in a memory within the communication device.

17. The method of claim 10, wherein retrieving information relating to the user comprises retrieving the information from a database stored in a second communication device coupled to the communication device, the second communication device comprising a mobile phone.

18. The method of claim 10, wherein retrieving information relating to the user comprises retrieving the information from a database stored in remote entity via the Internet.

19. A non-transitory computer-readable medium embodying a program executable in a communication device comprising a headset, the program comprising:
    code that retrieves a command from a user of the communication device for participating in the phone conferencing session, wherein the command from the user specifies a phone conferencing session status of the user;
    code that retrieves location data determined by a second communication device responsive to retrieving the command from the user;
    code that retrieves information for initiating the phone conferencing session according to both the current location and the user, the information comprising a conference call number assigned to a geographical area corresponding to the current location of the second communication device; and
    code that dials the retrieved conference call number to participate in the phone conferencing session.

20. The non-transitory computer-readable medium of claim 19, wherein the phone conferencing session status of the user comprises one of a host status and a participant status.

21. The non-transitory computer-readable medium of claim 19, wherein the code that initiates the phone conferencing session is configured to establish a link with a second communication device and initiate the phone conferencing session via the link with the second communication device.

22. A mobile communication device comprising a headset, comprising:
    a user interface module configured to retrieve a command from a user of the headset for participating in a phone conferencing session, wherein the command from the user specifies a phone conferencing session status of the user;
    location logic configured to retrieve location data determined by a second communication device;
    a memory interface configured to retrieve information for initiating the phone conferencing session according to both the current location and the user, the information comprising a conference call number assigned to a geographical area corresponding to the current location of the second communication device; and
    a network interface configured to dial the retrieved conference call number to participate in the phone conferencing session.

23. The mobile communication device of claim 22, wherein the user interface module is further configured to access calendar data associated with the user to facilitate retrieving the input from the user of the mobile communication device.

24. The mobile communication device of claim 22, wherein the network interface is configured to connect the mobile communication device to one of: the public switched telephone network (PSTN) and the Internet for initiating the phone conferencing session.

\* \* \* \* \*